R. C. KISSINGER.
TIRE CARRIER.
APPLICATION FILED AUG. 12, 1919.
1,392,507.
Patented Oct. 4, 1921.
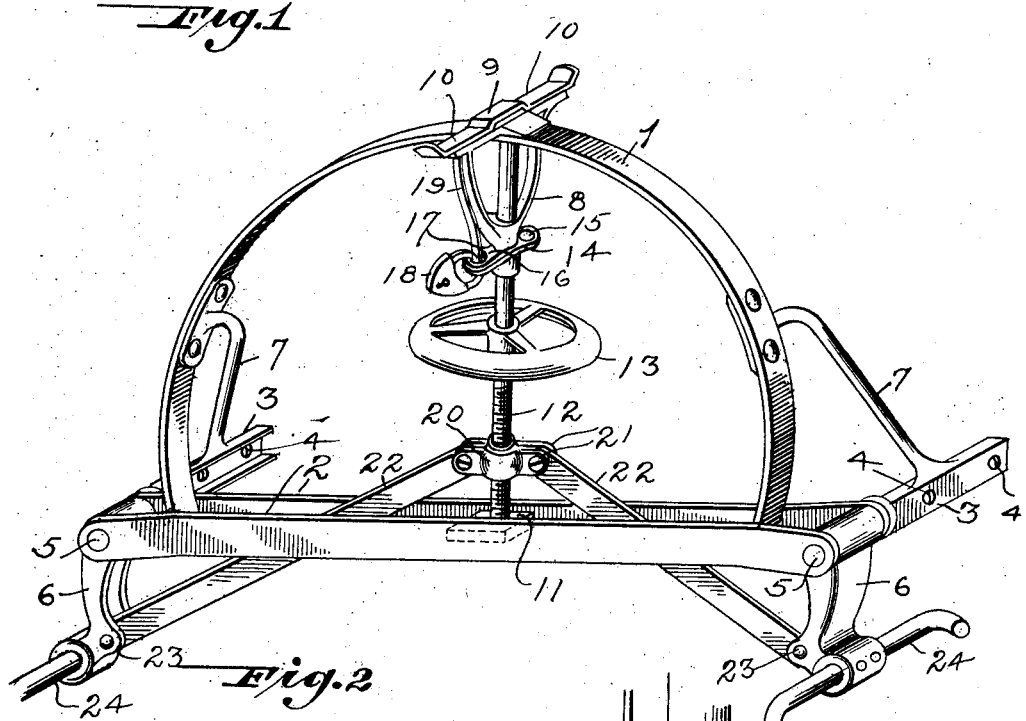
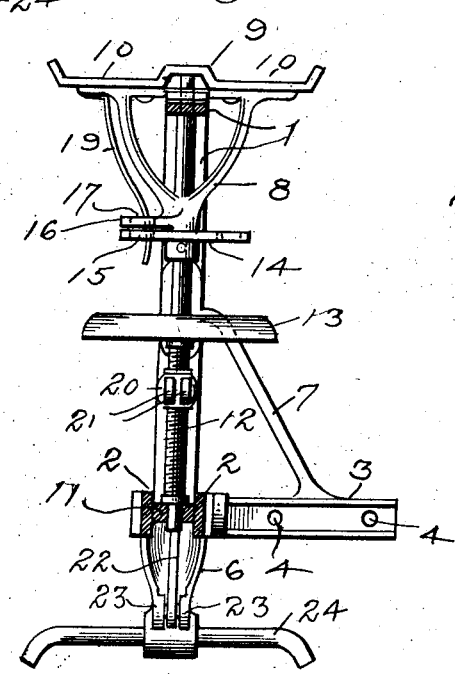
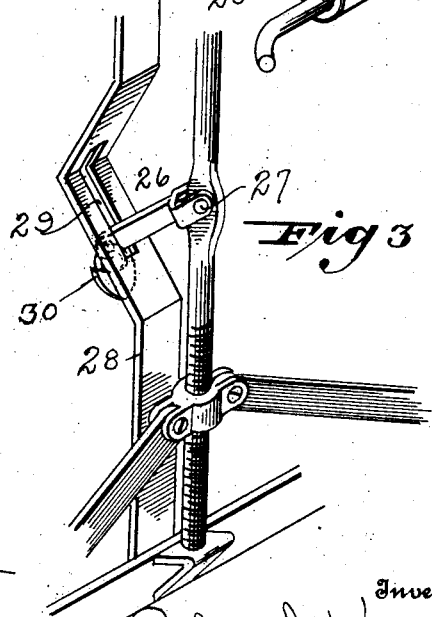
Inventor
Robert C. Kissinger
By F. L. Walker
Attorney

UNITED STATES PATENT OFFICE.

ROBERT C. KISSINGER, OF DAYTON, OHIO.

TIRE-CARRIER.

1,392,507. Specification of Letters Patent. Patented Oct. 4, 1921.

Application filed August 12, 1919. Serial No. 316,986.

*To all whom it may concern:*

Be it known that I, ROBERT C. KISSINGER, a citizen of the United States, residing at Dayton, in the county of Montgomery and State of Ohio, have invented certain new and useful Improvements in Tire-Carriers, of which the following is a specification.

My invention relates to motor vehicles and particularly to a tire carrier or a rack for spare tires, adapted to be connected to the rear of the vehicle chassis.

The object of the invention is to simplify the structure as well as the means and mode of operation of such tire carriers, whereby they will not only be cheapened in construction, but will be more efficient in use, easily applicable to existing vehicles, and unlikely to get out of repair.

A further object of the invention is to provide improved means for locking the tires in the rack or carrier, to prevent loss or unauthorized removal thereof, and further to provide such locking means which will be adjustable to accommodate tires of different sizes.

With the above primary and other incidental objects in view as will more fully appear in the specification, the invention consists of the features of construction, the parts and combinations thereof, and the mode of operation or their equivalents, as hereinafter described and set forth in the claims.

In the drawings, Figure 1 is a perspective view of the tire carrier or rack forming the subject matter hereof, detached from the vehicle. Fig. 2 is a vertical sectional view of the assembled rack or carrier. Fig. 3 is a detailed perspective view of a modification of the locking means for the carrier.

Like parts are indicated by similar characters of reference throughout the several views.

In constructing the device there is employed a main frame consisting of a semicircular bar 1, the ends of which are connected by transverse parallel bars 2—2. To the ends of these bars are attached supporting brackets 3—3. The brackets 3 may be of any desired or convenient shape or construction to agree with the vehicle chassis upon which the carrier is to be mounted. In the present instance these brackets are shown as channel bars having holes 4 therein for engagement with the chassis. The bracket bars 3 are provided with studs 5 which extend through the ends of the transverse bars 2 beyond the arcuate bar 1. These studs 5 also form trunnions for adjustable tire engaging arms 6 pivoted upon the studs between the protruding ends of the frame bars 2. A diagonal brace 7 connects the brackets 3 with the arcuate frame bar 1 serving to strengthen the frame and render it rigid. At the top of the frame bar 1 there is located a Y shaped member 8 to which is secured a tire supporting cleat 9 having therein one or more indentations 10 to receive the tires. In the present instance two such indentations have been shown. However cleats of different length may be attached to the supporting member 8 affording capacity for different numbers of tires.

Mounted in suitable bearings in the top of the frame bar 1 and the supporting member 8 at its upper end, is a revoluble screw threaded shaft 12. The screw shaft is engaged in a step block or transverse tie bar 11, at its lower end. Fixedly secured to the shaft 12 at a medial position is a hand wheel 13 by which the shaft is conveniently rotated.

Threaded upon the screw shaft 12 and movable vertically thereon by the rotation of the shaft is a nut 20 having oppositely disposed lugs 21, between which are pivotally connected links 22, the opposite ends of which are pivotally connected to ears 23 carried by the oscillatory arms 6. The construction is such that the links 22 and nut 20 form a toggle connection between the oscillatory arms 6, which is operated by the rotation of the screw shaft to swing the arms in or out according to the direction of rotation of the shaft 12.

The arms 6 carry tire engaging fingers 24 which engage the inner face of the tire while suspended upon the supporting cleat 9, and upon their outward movement prevent the disengagement of the tire due to the curved ends 25 of the fingers 24. The tire is thus engaged at three substantially equally spaced points, and upon the outward adjustment of the arms 6 by the rotation of the screw shaft, it is securely seated within the indentures of the cleat 9 and fingers 24.

Secured to the screw shaft 12 immediately below the supporting member 8 is a cross arm 14 having in each end thereof a hole 15. The supporting member 8 is provided with a rigid arm 16 projecting laterally therefrom and having therein a hole 17. The hole 17 in the arm 16 registers with the hole 15 in either end of the cross arm 14 at each half rotation of the screw shaft. The shaft is locked against rotation by passing a pad lock 18 through the registered holes 15 and 17. To prevent rattle and clatter of the lock, a spring finger 19 secured to the supporting member 8, extends within the hole 17 of the arm 16 and bears upon the inserted pad lock, but does not project into the path of the cross arm 14 or interfere with the rotation of the screw shaft. The locking of the shaft 12 against return rotation by inserting the pad lock through the registered holes 15 and 17 prevents accidental disengagement or unauthorized removal of the tire.

Fig. 3 discloses a modification in which a hand lever 26, pivoted at 27 to the screw shaft is substituted for the hand wheel 13. The main frame is provided with a vertical arm 28 having therein a bight one side of which is slotted as at 29. The lever 26 is of such length that when extended at substantially right angle to the shaft it will clear the vertical arm 28, passing freely to and fro through the bight thereof. However, the lever upon being turned downward is made to project through the slot 29. The end of the lever is perforated to receive a pad lock 30 in that portion projecting through the slot 29 and beyond the pendant arm.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms of modifications within the legitimate and valid scope of the appended claims.

Having thus described my invention, what I claim is:

1. In a tire carrier, a main frame, a tire engaging member fixedly carried thereby and two tire engaging members pivotally mounted thereon, a pair of toggle links connecting the pivoted tire engaging members one with the other, and an adjusting screw having stationary journal bearings in the main frame for the opposite end of the screw, and a threaded engagement with the toggle link adapted to flex the toggle links to vary the relation of the movable tire engaging members and means for locking the adjusting screw against rotation.

2. In a tire carrier, a main frame, a tire supporting member carried thereby, two movable tire engaging members adapted to simultaneously engage the inner circumference of the tire, and means for simultaneously adjusting said tire engaging members to and from each other including a revoluble screw, having spaced journal bearings in the main frame, and means for locking the screw.

3. In a tire carrier, a main frame, a tire supporting member carried thereby, two swinging arms pivoted to said main frame, toggle link for simultaneously oscillating the arms into and out of engagement with the tire, a screw threaded nut, carried by the toggle link, and an adjusting screw, mounted for revoluble movement in the main frame and engaging the nut to adjust said link, and thereby swing the arms into and out of engagement with the tire.

4. In a tire carrier, a main frame, a tire supporting member carried thereby, two swinging arms pivoted to said frame, a pair of interconnected oscillatory links connecting the swinging arms one with the other, an adjusting screw abutting on the main frame and adjustably engaging the link for varying the angular relation of the interengaged oscillatory links to adjust the swinging arms into and out of engagement with the tire and means for locking the screw against rotation.

5. In a tire carrier, a main frame, a tire supporting member carried thereby, two swinging arms pivoted to said main frame, a pair of pivotally connected oscillatory links connecting the swinging arms, one with the other and an adjusting screw having a screw threaded engagement with the pivotal connection of the links and abutting on the main frame adapted by its adjustment to effect the oscillation of the swinging arms into and out of engagement with the tire and means for locking the arms in adjusted position.

6. A tire holder comprising a bar, corresponding to a cord of the tire, tire engaging shoes pivoted thereto, on transverse axes, toggle links connecting said shoes for movement in unison, an adjusting screw operatively engaged with the toggle links, and means for locking said tire engaging shoes in various positions of adjustment.

7. A tire holder, comprising a bar, corresponding to a cord of the tire, an arcuate frame member, the ends of which are connected to said bar, oscillatory tire engaging members mounted on said frame, an adjusting screw having journal bearings in the bar and arcuate member respectively, an operative connection between said adjusting screw and the swinging tire engaging members, for adjusting said members by the rotation of the screw.

8. In a tire carrier, a main frame, a plurality of relatively adjustable tire engaging members carried thereby, means for adjusting said tire engaging members including a revoluble shaft having fixed journal bearings in the main frame, an arm carried by said shaft and rotating therewith, a perforated member fixedly secured in relation with the main frame, and means for detachably interengaging the said arm and perforated member to prevent the rotation of the shaft.

9. In a tire carrier, a main frame, a plurality of relatively adjustable tire engaging members carried thereby, means for adjusting said tire engaging members including a revoluble shaft having fixed journal bearings in the main frame, an arm carried by said shaft and rotating therewith, and means upon the main frame with which the arm may be interengaged to prevent the rotation of the shaft.

10. In a tire carrier, a main frame, a plurality of relatively adjustable tire engaging members carried thereby, toggle links connecting the tire engaging members, adjusting means for said toggle links, and means for locking said links in various positions of adjustment substantially as specified.

11. In a tire carrier, a main frame, a plurality of relatively adjustable tire engaging members, carried thereby, means for adjusting said tire engaging members including a revoluble shaft mounted for revoluble movement only in relation with the main frame, an arm carried by said shaft, an arm carried by the main frame, said arms having openings therein registering one with the other when the arms are in alined relation, and locking means adapted to engage through said registered openings.

12. In a tire carrier, a main frame, a plurality of tire engaging members carried thereby, an adjusting member therefor, said main frame having an opening therein, the adjusting member having an opening adapted to be registered with the opening in the main frame, said registered openings being adapted to receive a locking member and a spring finger carried by one of the interlocked parts extending into proximity to the opening therein and bearing on said locking member.

13. A tire holder comprising an arcuate frame bar, and a transverse bar, corresponding to a cord of the arcuate bar, and connecting the ends thereof, an adjusting screw, having journal bearings in the cord bar and arcuate bar respectively, a screw threaded nut engaging said adjusting screw, and longitudinally movable thereon, oppositely extending toggle links, engaged with said nut and tire engaging members carried at the end of said toggle links.

In testimony whereof, I have hereunto set my hand this 8th day of August, A. D. 1919.

ROBERT C. KISSINGER.

Witness:
HARRY F. NOLAN.